(12) United States Patent
Schäfer et al.

(10) Patent No.: US 6,602,973 B2
(45) Date of Patent: Aug. 5, 2003

(54) METHOD FOR PRODUCING ONE-COMPONENT SEALING AND COATING COMPOUNDS WITH A POLYURETHANE BASE

(75) Inventors: Martin Schäfer, Tamm (DE); Wilko Moroni, Osterode/Harz (DE); Michael Hiller, Löchgau (DE)

(73) Assignee: Sika Chemie GmbH (DE)

( * ) Notice: Subject to any disclaimer, the term of this patent is extended or adjusted under 35 U.S.C. 154(b) by 0 days.

(21) Appl. No.: 09/445,051

(22) PCT Filed: May 22, 1998

(86) PCT No.: PCT/EP98/03027

§ 371 (c)(1),
(2), (4) Date: Dec. 1, 1999

(87) PCT Pub. No.: WO98/55524

PCT Pub. Date: Dec. 10, 1998

(65) Prior Publication Data

US 2002/0156168 A1 Oct. 24, 2002

(30) Foreign Application Priority Data

Jun. 4, 1997 (DE) .......................................... 197 23 355

(51) Int. Cl.$^7$ .............................................. C08G 18/10
(52) U.S. Cl. ..................... 528/60; 524/505; 524/425; 524/423; 524/356; 524/354; 524/355; 524/451; 524/492; 524/474
(58) Field of Search .................... 524/505, 425, 524/423, 356, 354, 355, 451, 492, 474; 528/60

(56) References Cited

U.S. PATENT DOCUMENTS

| 4,456,718 A | * | 6/1984 | Brinkmann et al. ......... 524/114 |
| 5,266,145 A |   | 11/1993 | Duck et al. ............... 156/307.3 |
| 5,290,905 A | * | 3/1994 | Komiya et al. ................ 528/80 |

FOREIGN PATENT DOCUMENTS

| DE | 269 155 A5 | 10/1987 | ............ C09K/3/10 |
| DE | 41 02 341 A1 | 7/1992 | ............ C08G/18/10 |
| DE | 44 29 076 A1 | 2/1996 | ............ C08G/18/12 |
| EP | 0 510 476 A1 | 4/1992 | ............ C08G/18/70 |
| EP | 516110 | * 12/1992 | |

* cited by examiner

Primary Examiner—Rachel Gorr
(74) Attorney, Agent, or Firm—Pendorf & Cutliff

(57) ABSTRACT

A method for producing a one-component sealing and coating compound with a polyurethane base. The method provides a simpler means of production as well as guarantees improved storage stability of the compounds produced, and comprises the following steps: agitating a mixture of poly components and one diisocyanate component to obtain an isocyanate prepolymer with a residual content of monomeric diisocyanate of >2 wt per ct; dispersing pigments and inorganic fillers in the mixture and adding a solvent whilst agitating, the residual content of monomeric diisocyanate reacting with the moisture provided by the fillers so as to obtain a $H_2O$ content of <0.01 wt per ct in the reaction mixture; adding a $H_2O$— reactive latent hardener and optionally, at least one catalyst, and airtight packing of the resulting sealing and coating compound.

12 Claims, 1 Drawing Sheet

METHOD FOR PRODUCING ONE-COMPONENT SEALING AND COATING COMPOUNDS WITH A POLYURETHANE BASE

BACKGROUND OF THE INVENTION

1. Field of the Invention

The present invention relates to a method for producing one-component sealing- and coating compounds with a polyurethane base.

2. Description of the Related Art

Well known and precisely examined are binding agents for sealing- and coating compounds which contain isocyanate-prepolymers which can be produced by reaction of isocyanates with molecules with active hydrogen atoms like amines and alcohols and cure under the influence of humidity. DE-A 1 520 139 for example describes a procedure to produce moisture curing mixtures of polyisocyanates and polyketimines or polyaldimines, using isocyanate-prepolymers as polyisocyanate component. DE-A 2 018 233 describes moisture-curable preparations from isocyanate groups containing binding agents and polyoxazolidines.

EP-A 0 702 039 describes a procedure to produce isocyanate-prepolymers by reaction of aromatic or cycloaliphatic diisocyanates with a polyol component providing that there is a rest-content of monomeric diisocyanates of less than 0.5 weight % contained in the isocyanateprepolymers. When cycloaliphatic diisocyanates are used, the excessive diisocyanate has to be removed after the reaction has been finished by thin-layer destillation until the desirable rest content of less than 0.5 weight % is reached. Furthermore it is known from EP-A 0 702 039 and from DE-A 1 520 139 to add filling material and $H_2O$-reactive hardener to the mentioned isocyanate-prepolymer with low rest content of monomeric diisocyanates in order to produce sealing- and coating material. To guarantee constancy of quality and storage stability of sealing- and coating material on the basis of already described prepolymers only a low content of water is allowed to exist. This way for example, a reaction of moisture which is introduced by the filling material with free isocyanate groups under cleavage of $CO_2$ can lead to a dangerous increase of pressure within the bucket. Apart from that, we see that—in the presence of hydrolysis-sensitive, latent amine curing agents for example of the type of oxazolidines, ketimines or aldimines—the lowest degree of rest moisture by reaction with the curing agent leads to a thickening or curing of the material in the bucket. After a certain degree of viscosity of more than 8000 mPas is reached, the material is no more brushable or otherwise applicable. That is why in practise expensive drying techniques like for example dehydrating agents or a very costly physical predrying are applied.

SUMMARY OF INVENTION

Based on this, the invention had for its purpose to provide a manufacturing process of sealing- and coating compounds so that an improved storage stability plus a simultaneous reduction of processing costs can be attained.

The following steps show how the problem is solved according to the invention by some in-situ process:

stirring a mixture containing a polyol component and a diisocyanate component so that an isocyanate-prepolymer with a rest of monomeric diisocyanate of >2 weight % is obtained intermediary.

dispersing of pigments and anorganic filling material and adding of solvent while stirring, so that the rest of the monomer diisocyanate reacts with the moisture that is introduced by the filling material and a $H_2O$-content of <0.01 weight % is obtained in the reaction mixture.

adding a $H_2O$-reactive latent curing agent and at least one catalyst, if necessary, and air-proof filling of the resulting sealing- and coating compound.

BRIEF DESCRIPTION OF DRAWING

The invention will subsequently be explained in detail by one illustration and some performing examples.

DETILED DESCRIPTION OF THE INVENTION

Figure 1:
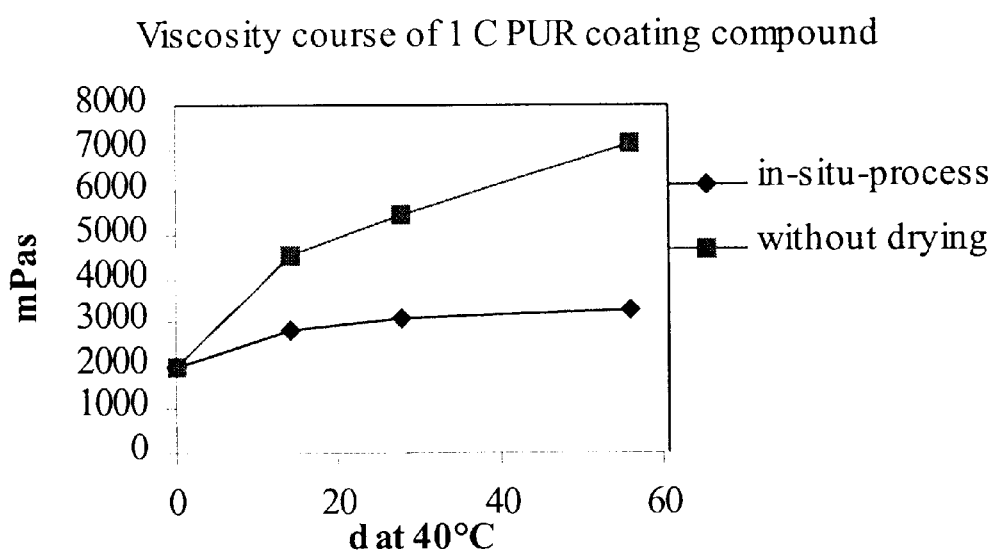
FIG. 1 shows the viscosity course of an one component polyurethane coating compound according to the invention (lower curve) and of a coating compound according to the technology standard (upper curve).

In the process according to the invention in hand concerning the production of sealing- and coating compounds, isocyanate-containing prepolymers are produced as basis binding agents in a first step of process. It is important to out door floor coatings, especially of balconies that isocyanate-containing prepolymers are saponification- and light-stable at the same time. Isocyanateprepolymers on the basis of polyetherpolyoles are saponification stable but less light-stable. On the other hand isocyanateprepolymers on the basis of polyesterpolyols, polyesterpolycarbonatepolyols and polyhydroxyacrylates are light-stable but can't be brought into direct contact with concrete floor surface because of their bad saponification stability. Beyond this, these polyoles have a very high grade of viscosity which requires the use of large quantities of solvents. But the application of large amounts of solvents is to the detriment of the ecological standpoint. By mixture of polyestercarbonatediols or polyhydroxyacrylates with polyether, binding materials are obtained that show a low viscosity and the curing of these binders with cycloaliphatic diisocyanates and maybe latent amine hardeners build up blockcopolymers that show a very high saponification- and light stability. In the process according to the invention a mixture of poly-alkyleneetherpolyol and polyesterpolycarbonatediol are preferably used as a polyol component. Mixtures of a polyalkyleneetherpolyol and a polyester-polyetherpolyol (Fatty acis ester) or a polyhydroxyacrylate can be used as well.

Polyalkyleneetherpolyoles of the molecular weight of approx. 1000 until approx. 6000 g/mol are used preferably. Special preference is given to a polypropyleneglycol, difunctional, of an average molecular weight of 2000 g/mol or to a polypropyleneglycol, trifunctional, with an average molecular weight of 4000 g/mol. According to the invention a polyestercarbonate of an average molecular weight of approx. 1500 g/mol to approx. 2500 g/mol, preferably of 2000 g/mol, is used as a further component of the polyol mixture in the process. The polyesterpolycarbonatediols, for example, present polycarbonates of the 6-hydroxyhexaneacid-6-hydroxyhexylester.

According to the invention the process uses preferably cycloaliphatic diisocyanates as an initial compound for the isocyanateprepolymer. Cycloaliphatic diisocyanates are called those that show at least one cycloaliphatic ring per molecule and have at least one of both isocyanatgroups directly attached with a cycloaliphatic ring. Appropiate as such are for example cycloaliphatic diisocyanates like 1-isocyanato-3,3,5-trimethyl-5-isocyanato-methylcyclohexane (Isophoronediisocyanate IPDI).

The used diisocyanates show varying reactive isocyanategroups within the molecule. 1-Isocyanato-3,3,5-trimethyl-5-isocyanatomethylcyclohexane (Isophoronediisocyanate IPDI) for example has one primary and one secondary isocyanategroup that are significantly different on account of their reactivity concerning the OH/NCO reaction.

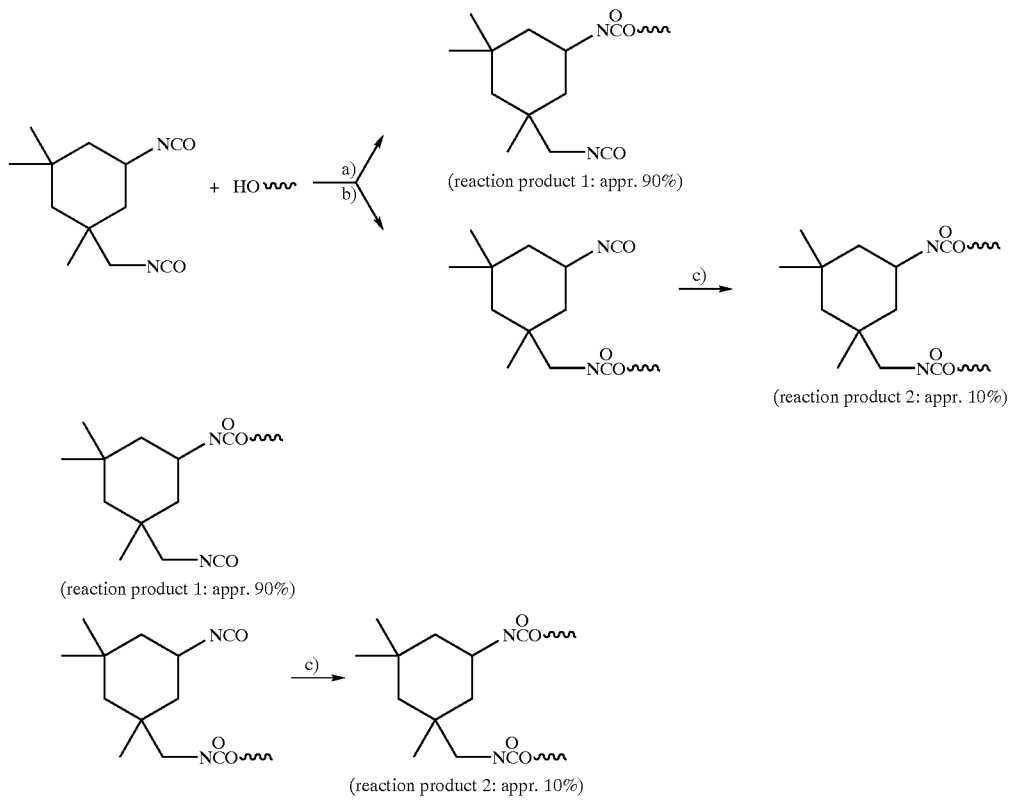

In presence of the Lewis acids, like for example dibutyltindilaurate (DBTL), the reactivity of the secondary NCO group (see reaction way a)) is about one factor 10 higher than that of the primary NCO group (see reaction way b)—(N. Marscher, H. Höcker, Makromolekulare Chemie 191, 1843–1852 (1990)).

The conversion of IPDI with diols in a molar ratio of 2:1 following the above mentioned reaction scheme results in a kinetic controlled product distribution of the reaction products 1 to 2 in a ratio of approx. 9:1. As a consequence, about 10% of the monomeric diisocyanate do not react at all with polyol and at the end of the reaction are left as residual monomers. This yields in case of a reaction of a diol with an average molecular weight of about 2000 g/mol with IPDI to a residual monomeric content of IPDI of 2.5–2.8 weight %.

The production of the prepolymer takes place by stirring the polyol components and the IPDI in a vacuum-dissolver within a temperature range of 50° C. to 100° C., preferably at 90° C., until the content of the monomeric IPDI is not decreasing anymore.

In a second process step, without isolating the yielded reaction products, the pigments and the inorganic filling material of the group of heavy spar (BaSO$_4$), calcium carbonate, talcum or quartz powder, which show a water content of 0.1 to 1 weight %, in an amount up to 60 weight %—with regard to the entire weight of the components—are added also at 90° C. by being intensively stirred. Simultaneously with the pigment powder and filling material, a solvent of the group of ethylacetate, butylacetate, methylethylketone, methoxypropylacetate, toluene, xylene, or mixtures of the same in a quantity of up to 20 weight % with regard to the total weight of all components, is added.

It is to be stirred at 90° C. for another 45 minutes and the excessive monomeric diisocyanate reacts with water which has been brought in by the filling materials. After cooling and adding of a hydrolysis-sensitive, latent curing agent and of at least one catalyst, the material is filled air-proof. Sealing- and coating compounds that are produced this way excell by a special low water content and from this results a high storage stability.

The hydrolysis-sensitive, latent curing agents can be chosen out of the group of oxazolidines, bisoxazolidines, ketimines or aldimines; the at least one catalyst can be chosen out of the group of p-toluenesulfonacid, dibutyltindilaurat, zinc chloride or organic acidanhydrides. A bisoxazolidine hardener is used preferably. The hardening of this system is based on a reaction of the oxazolidinerings with humidity of air by a cleavage of the oxygen bond of the oxazolidine ring. The reaction of the so formed aminealcohol with the isocyanate prepolymer follows.

FIG. 1 shows the viscosity course of a one component polyurethane coating compound for the in-situ-process according to the standard of technology (curve above) over a period of 8 weeks and a storage temperature of 40° C. It is evident from the illustration that the viscosity flux in case of the process according to the invention, that is determined due to the reaction of the excessive monomeric diisocyanate with the water introduced by the filling materials and so leads to a drying of the coating compound, is significantly more favourable than the process without desiccation according to the standard of technology.

EXAMPLES

Example 1

1200 g polypropyleneglycol, difunctional, average molecular weight 2000 g/mol, 1200 g polyesterpolycarbonatediol, average molecular weight 2000 g/mol, (Desmophen C 200, Bayer Company) and 550 g 1-isocyanato-3,3,5-trimethyl-5-isocyanatomethylcyclohexane (IPDI), are stirred at 90° C. in a vacuumdissolver until the concentration of monomeric IPDI (approx. 2.5–2.8 weight % IPDI) does not decrease anymore (approx. 90 minutes). Subsequently 4834 g $BaSO_4$, 400 g pigment powder and 1400 g xylene are added while strongly disperged at 90° C. After a stirring time of 45 minutes at 90° C. the reaction mixture is cooled down to room temperature. Then 400 g of a bisoxazolidine hardener (Härter OZ, Bayer Company), 1 g of dibutyltindilaurate and 10 g of 4-methyl-hexahydrophthalacidanhydride are added. A coating compound with the following characteristic data is obtained:

| | |
|---|---|
| solid content: | 86% |
| viscosity at 20° C.: | 2 Pas |
| content of monomeric IPDI: | 0.14% |
| content of $H_2O$: | 0.005% | cured material (7 days at 23° C., 50% relative humidity):

| | |
|---|---|
| tensile strength: | 9 N/mm$^2$ |
| elongation at break: | 400% |

Before the filling material is added the rest concentration of monomeric IPDI is 2.8% concerning the pure binding agent (30% of the total formulation) what is equivalent to a concentration of 0.0038 mol IPDI.

The water content of $BaSO_4$ is approx. 0.14 weight % in relation to pure $BaSO_4$ (48% of the total formulation) what is equivalent to a content of 0.0037 mol $H_2O$.

During the stirring of 45 minutes of the reaction mixture in the presence of $BaSO_4$ the following desiccation reaction can be observed.

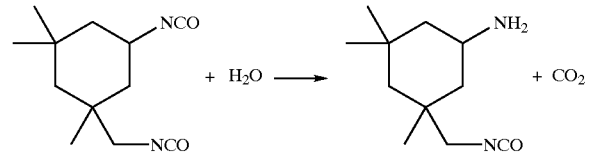

The originating amine reacts in some unspecific secondary reactions with additional NCO groups existant in the reaction mixture under formation of carbamide bindings. So approximately one can assume a stoichiometrical relation of IPDI to $H_2O$ of 1:1 for the desiccation reaction. This corresponds very well with the values found in practice.

Following values have been stated in the final formulation:

| | | |
|---|---|---|
| monomeric IPDI: | 0.14 weight % => | 6 × 10$^{-4}$ mol |
| $H_2O$: | 0.005 weight % => | 3 × 10$^{-4}$ mol |

COMPARISON EXAMPLE

Into a mixture composed out of 1500 g prepolymer 1 (reaction product of a polyetherpolyol on the basis of propyleneoxide with an equivalent weight of approx. 1000 g/val with IPDI with a restmonomeric content of <0.5%, (Desmodur E 41, Bayer Company)) and 1500 g prepolymer 2 (reaction product of a polyestercarbonatediol with IPDI with a molecular weight of approx. 2000 g/mol and a restmonomeric content of 0.5% (Desmodur VPLS 2958, Bayer Company)), 4789 g $BaSO_4$, 400 g pigment powder and 1400 g xylene at room temperature are added while strongly beeing disperged. 400 g of a bisoxazolidine hardener (Härter OZ, Bayer Company), 1 g dibutyltindilaurate and 10 g 4-methyl-hexahydrophthalacidanhydride are added.

A coating compound with the following characteristic data is obtained:

| | |
|---|---|
| solid content: | 86% |
| viscosity at 20° C.: | 2 Pas |
| content of monomeric IPDI: | <0.12% |
| content of $H_2O$: | 0.07% | cured material (7 days at 23° C., 50% relative humidity):

| | |
|---|---|
| tensile strength: | 9 N/mm$^2$ |
| elongation at break: | 400% |

Example 2

1000 g polypropyleneglycol, trifunctional, average molecular weight 4000 g/mol, 1000 g of a solution of a polyhydroxyacrylate, approx. trifunctional, average molecular weight Mn=1300 g/mol, (Joncryl SCX-507, Jonson Polymer Company) in butylacetate with an OH content of 4.2% related to the solid matter and 650 g 1-isocyanato-3,3,5-trimethyl-5-isocyanatomethylcyclohexane (IPDI) are stirred at 90° C. in a vacuumdissolver until the content of monomeric IPDI (approx. 2.6 weight % IPDI) does not decrease anymore (approx. 90 minutes). Then, while being strongly disperged at 90° C., 5139 g $BaSO_4$, 400 g pigment powder and 1400 g xylene are added. After a stirring time of 45 minutes at 90° C. the reaction mixture is cooled down to room temperature and 400 g of a bisoxazolidine hardener (Härter OZ, Bayer Company), 1 g of dibutyltindilaurate and 10 g of 4-methyl-hexahydrophthalacidanhydride are added.

A coating compound with the following characteristic data is obtained:

| | |
|---|---|
| solid content: | 84% |
| viscosity at 20° C.: | 3 Pas |
| content of monomeric IPDI: | 0.18% |
| content of $H_2O$: | 0.005% | cured material (7 days at 23° C., 50% relative humidity):

| | |
|---|---|
| tensile strength: | 10 N/mm$^2$ |
| elongation at break: | 80% |

Example 3

1500 g polypropyleneglycol, trifunctional, average molecular weight 4000 g/mol, 528 g of a fatty acid ester, approx. trifunctional, average molecular weight 561 g/mol, (Sovermol 750, Henkel Company) with an OH content of 9.1 % related to the solid matter and 810 g 1-isocyanato-3,3,5-trimethyl-5-isocyanatomethylcyclohexane (IPDI) are stirred at 90° C. in a vacuumdissolver until the content of monomeric IPDI (approx. 2.8 weight % IPDI) does not decrease anymore (approx. 90 minutes). Subsequently 5039 g $BaSO_4$, 400 g pigment powder and 1312 g xylene are added while being strongly disperged at 90° C. After a stirring time of 45 minutes at 90° C. the reaction mixture is cooled down to room temperature. Then 400 g of a bisoxazolidine hardener (Härter OZ, Bayer Company), 1 g of dibutyltindilaurate and 10 g of 4-methyl-hexahydrophthalacidanhydride are added.

A coating compound with the following characteristic data is obtained:

| | |
|---|---|
| solid content: | 86% |
| viscosity at 20° C.: | 2 Pas |
| content of monomeric IPDI: | 0.18% |
| content of $H_2O$: | 0.005% | cured material (7 days at 23° C., 50% relative humidity):

| | |
|---|---|
| tensile strength: | 12 N/mm² |
| elongation at break: | 50% |

The formulations of the coating compounds from the examples 1,2 and 3 contain:

28–34 weight % prepolymer
52–56 weight % filling material/pigments
14–16 weight % solvents
4 weight % latent hardener.

The sealing- and coating compounds that are produced according to the method according to the invention show a very high storage stability of at least one year.

What is claimed is:

1. A method for producing a one-component sealing and coating compound with a polyurethane base, comprising:
   (a) mixing and stirring a polyol component and a diisocyanate component to obtain an isocyanate prepolymer with >2 weight % residual monomeric diisocyanate as an intermediary product;
   (b) dispersing pigments and inorganic filling material, said filling material containing some moisture, into the product of step (a) and adding solvents while stirring, such that said residual monomeric diisocyanate reacts with said water introduced with the filling material until an $H_2O$ content of <0.01 weight % is obtained in the reaction mixture; and
   (c) adding an $H_2O$ reactive latent curing agent and optionally one catalyst, and filling the resulting sealing- and coating compound into a container under exclusion of air.

2. A method according to claim 1, wherein said polyol component is a mixture of a polyetherpolyol with a polyesterpolyol and/or a polyesterpolyether-polyol, polyesterpolycarbonatediol, or polyhydroxyacrylate.

3. A method according to claim 2, wherein said polyetherpolyol component is composed of polyetherpolyols of an average molecular weight of 1000 to 6000 g/mol with incorporated ethyleneoxide- and/or propyleneoxide units.

4. A method according to claim 3, wherein said polyetherpolyol component is selected from the group consisting of difunctional polypropyleneglycols with an average molecular weight of 2000 g/mol or trifunctional polypropyleneglycols with an average molecular weight of 4000 g/mol.

5. A method according to claim 2, wherein said polyesterpolycarbonatediol has an average molecular weight of 2000 g/mol, on the basis of the polycarbonate of 6-hydroxyhexaneacid-6-hydroxyhexylester.

6. A method according to the claim 1, wherein said diisocyanate component is at least one cycloaliphatic diisocyanate.

7. A method according to claim 6, wherein said diisocyanate-component is 1-isocyanato-3, 3, 5-trimethyl-5-isocyanatomethyl-cyclohexane (IPDI).

8. A method according to claim 1, wherein step (a) involves reaction of polypropyleneglycol and polyester polycarbonatediol and 1-isocyanato-3, 3, 5-trimethyl-5-isocyanatomethylcyclohexane (IPDI) in a molar ration of 1:1:4 while being stirred in a vacuum-dissolver for about 90 minutes at about 90° C. so that a residual content of monomeric disocyanate (IPDI) of 2.5 to 2.8 weight % remains in the reaction mixture.

9. A method according claim 1, wherein in step (b) the pigment, filling material and solvent are added at about 90° C. into the reaction mixture and dispersed while strongly being stirred, followed by cooling the reaction mixture to room temperature, and then adding the latent curing agent and optionally one or more catalyst.

10. A method according to one claim 1, wherein said pigments and inorganic filling materials are selected from the group consisting of barium sulfate ($BaSO_4$), calcium carbonate, talc and quartz powder with a water content of 0.1 to 1 weight % $H_2O$, based on the weight of filling material, and wherein said pigments and inorganic filling materials are added in a total quantity of up to 60 weight % based the total weight of the composition.

11. A method according to claim 1, wherein said solvent is selected from the group consisting of ethyl acetate, butyl acetate, methylethyl ketone, methoxypropyl acetate, toluene, xylene, and mixtures of the same, and wherein said solvent is added in an amount of up to 20 weight %, based on the total weight of the components.

12. A method according to claim 1, wherein said latent curing agent is selected from the group consisting of oxazolidine, bisoxazolidine, ketimine and aldimine, and wherein said optional catalyst is selected from the group consisting of p-toluenesulfonic acid, dibutyltindilaurate, zincchloride and organic acid anhydrides.

* * * * *